United States Patent
Umezawa et al.

(10) Patent No.: US 7,165,755 B2
(45) Date of Patent: Jan. 23, 2007

(54) MOTOR-OPERATED VALVE

(75) Inventors: Hitoshi Umezawa, Tokyo (JP); Yasushi Inoue, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 0 days.

(21) Appl. No.: 11/209,443

(22) Filed: Aug. 23, 2005

(65) Prior Publication Data
US 2006/0043325 A1 Mar. 2, 2006

(30) Foreign Application Priority Data
Sep. 1, 2004 (JP) .............................. 2004-254844

(51) Int. Cl.
*F16K 31/04* (2006.01)
(52) U.S. Cl. ................................ 251/129.11
(58) Field of Classification Search ............ 251/129.11
See application file for complete search history.

(56) References Cited

U.S. PATENT DOCUMENTS

| | | | |
|---|---|---|---|
| 4,412,517 A * | 11/1983 | Kobashi et al. | 123/339.26 |
| 4,948,091 A * | 8/1990 | Satoh et al. | 251/65 |
| 6,224,034 B1 * | 5/2001 | Kato et al. | 251/164 |
| 6,325,055 B1 * | 12/2001 | Yokoyama et al. | 123/568.24 |

FOREIGN PATENT DOCUMENTS

| | | |
|---|---|---|
| EP | 0361539 | 4/1990 |
| JP | 61 099782 A | 5/1986 |
| JP | 61 103077 A | 5/1986 |
| JP | 2001-050415 A | 2/2001 |

* cited by examiner

*Primary Examiner*—J. Casimer Jacyna
(74) *Attorney, Agent, or Firm*—Baker Botts L.L.P.

(57) ABSTRACT

A motor-operated valve comprising a valve stem having a valve plug; a valve body having a valve seat with which the valve plug is enabled to removably contact; a can fixed to the valve body; a rotor disposed coaxially in the can; a stator disposed around an outer circumferential surface of the can; a guide bush fixedly secured to the valve body and having an axial hollow portion in which the valve stem is permitted to slidably move; and a valve stem holder; wherein the valve stem is enabled to rotate integral with the valve stem holder and to move in the longitudinal direction thereof relative to the valve stem holder. The motor-operated valve is further provided with a flow rate adjusting feed screw mechanism which is constituted by a first stationary threaded portion and a first movable threaded portion; and with a rotation regulating feed screw mechanism which is constituted by a second stationary threaded portion and a second movable threaded portion. The pitch of the flow rate adjusting feed screw mechanism is made smaller than the pitch of the rotation regulating feed screw mechanism.

4 Claims, 3 Drawing Sheets

MOTOR-OPERATED VALVE

FIELD OF THE INVENTION

The present invention relates to a motor-operated valve to be built in an air conditioner, a refrigerator, etc. In particular, the present invention relates to a motor-operated valve which is capable of finely controlling the flow rate of refrigerant to a very small extent.

BACKGROUND INFORMATION

One example of the conventional motor-operated valve of this kind is shown in FIG. 3. The motor-operated valve 10' shown therein is provided with a valve chamber 21, a valve seat 22 (a valve aperture 22a), and a valve body 20 having a flange-like member 23. The valve body 20 is constructed such that the flow rate of fluid such as refrigerant can be adjusted by a valve plug 24a (a valve stem 24) which is enabled to move close to or away from the valve seat 22. A top-closed cylindrical can 40 having an opened bottom is hermetically connected, through a lower end 40b thereof, with the flange-like member 23 (through a step portion 23a provided thereon) of valve body 20 by means of butt welding.

The valve chamber 21 of valve body 20 is communicated, through one side portion thereof, with a refrigerant inlet pipe 61 and also communicated, through a bottom portion thereof, with a refrigerant outlet pipe 62.

A rotor 30 is coaxially positioned in the can 40 with a predetermined gap being formed between the outer circumferential wall of the rotor 30 and the inner circumferential wall of the can 40. A stator 50 comprising a yoke 51, a bobbin 52, stator coils 53 and a resin mold cover 56 is disposed around the outer circumferential wall of the can 40, thereby constituting, together with the rotor 30, a stepping motor.

A driving mechanism for enabling the valve plug 24a to move close to or away from the valve seat 22 by making use of the rotation of the rotor 30 is provided between the rotor 30 and the valve stem 24. Specifically, this driving mechanism is constituted by a feed screw mechanism 15 which comprises a cylindrical guide bush 26 (having a stationary threaded portion 25 formed on the outer circumference thereof) which is fixed, through a lower end portion 26a thereof, to the valve body 20 and has an axial hollow portion in which the valve stem 24 is permitted to slidably move, and a cylindrical valve stem holder 32 (having a movable threaded portion 31 formed on the inner circumferential surface thereof and adapted to be engaged with the stationary threaded portion 25) which has an opened lower end and is coaxially disposed around the outer circumferential surfaces of the valve stem 24 and the guide bush 26.

More specifically, an upper portion of the valve stem 24 is slidably inserted into an upper hollow portion of the valve stem holder 32 and the top portion of the valve stem 24 is fastened by means of nut 33. As the valve stem holder 32 is rotationally moved up and down by means of the feed screw mechanism 15, the valve stem 24 is caused to correspondingly move up and down without being rotated together with the rotation of the valve stem holder 32.

According to the motor-operated valve 10' which is constructed as described above, when the stator coils 53 are excited through the application of electric current thereto in one direction under a condition where the valve plug 24a is kept away or lifted from the valve seat 22 (valve aperture 22a is opened), the rotor 30 and the valve stem holder 32 are caused to rotate in one direction relative to the guide bush 26 which is fixedly secured to the valve body 20, thereby causing the valve stem holder 32 to move downward by means of the feed screw mechanism 15, whereby the valve plug 24a is enabled to press-contact with the valve seat 22, thus closing the valve aperture 22a.

Even at this moment where the valve plug 24a is seated on the valve seat 22, a movable stopper 37 provided at a lower end portion of the valve stem holder 32 is not yet contacted with a stationary stopper 27 fixed to the valve body 20, so that the rotor 30 and the valve stem holder 32 are still permitted to rotationally move downward with the valve aperture 22a being kept closed by the valve plug 24a. On this occasion, since the valve stem holder 32 is moved downward relative to the valve stem 24, a buffer coil spring 34 interposed between the valve stem holder 32 and the valve stem 24 is compressed. As a result, the valve plug 24a of valve stem 24 is strongly pressed onto the valve seat 22, thus closing the valve. Thereafter, when the rotor 30 is further rotated to cause the valve stem holder 32 to move downward, the movable stopper 37 is caused to press-contact with the stationary stopper 27, so that even if the application of electric current to the stator coils 53 is continued, the rotation and downward movement of the valve stem holder 32 can be forcedly suspended.

Under this suspended condition of the valve stem holder 32, when the stator coils 53 are excited through the application of electric current thereto in the other direction, the rotor 30 and the valve stem holder 32 are caused to rotate in a direction, which is opposite to the aforementioned one direction, relative to the guide bush 26. As a result, the valve stem holder 32 is caused to move upward by means of the feed screw mechanism 15, thereby enabling the valve plug 24a to move away from the valve seat 22 to open the valve aperture 22a. As a result, the refrigerant that has been introduced into the valve chamber 21 from an inlet pipe 61 is permitted to flow via the valve aperture 22a into an outlet pipe 62. In this case, the flow rate of refrigerant can be adjusted depending on the magnitude of lift of the valve plug 24a (for details, see JP Laid-open Patent Publication (Kokai) No. 2001-50415).

In the case of the conventional motor-operated valve 10' which is constructed as described above, the flow rate of refrigerant is determined depending on the effective area of aperture of the valve aperture 22a, i.e. on the magnitude of lift of the valve plug 24a from the valve seat 22. The magnitude of lift of the valve plug 24a is determined depending on the pitch of the feed screw mechanism 15 and on the rotational speed of rotor 30 (the number of steps of the stepping motor).

In the case of the motor-operated valve of this kind, the maximum magnitude of lift (a fully opened state) of the valve, in other words, the maximum number of steps of stepping motor is generally determined in advance for enabling a desired maximum flow rate to be obtained. Namely, the motor-operated valve is designed such that the control of electric current to the stators can be performed so as to enable the rotor to rotate five revolutions at maximum for example. In this case, if the pitch of the feed screw mechanism 15 is set to 0.6 mm for example, the magnitude of lift of the valve plug 24a can be changed at intervals of 0.6 mm, i.e. 0.6 mm, 1.2 mm, 1.8 mm, 2.4 mm, 3.0 mm, as the rotor 30 and the valve stem holder 32 are caused to rotate one revolution, two revolutions, three revolutions, four revolutions and five revolutions, respectively.

Meanwhile, in the case of the motor-operated valve to be employed in a refrigerator (to be employed as an expansion valve) in particular, since the flow rate of refrigerant to be controlled is very small, it is difficult to finely control the flow rate of refrigerant. Further, when carbon dioxide gas is to be employed as a refrigerant, it is required to increase the pressure of refrigerant to a high pressure (about 10 times as high as the conventional pressure). However, there is a problem that when a high-pressure refrigerant is employed with the valve plug being lifted at intervals of 0.6 mm as described above, the fluctuation of flow rate of refrigerant would become too large.

It may be conceivable to minimize the size or angle (effective area of aperture) of the valve aperture as one of countermeasures for solving the aforementioned problems. However, there is a limitation in decreasing the effective area of aperture of valve and moreover, even if such a countermeasure is employed singly, it would not lead to full solution to the aforementioned problems.

It may be also conceivable, as another countermeasure, to minimize the pitch of the feed screw mechanism 15 (for example, to decrease the pitch of 0.6 mm to 0.2 mm). However, when the pitch of feed screw mechanism 15 is decreased, the magnitude of lift per the revolution of the rotor would become too small, thereby raising a problem that the stationary stopper 27 for regulating the rotation may not be suitably contacted with or moved away from the movable stopper 37.

BRIEF SUMMARY OF THE INVENTION

The present invention has been made under the circumstances mentioned above and, therefore, an object of the present invention to provide a motor-operated valve which is capable of finely and appropriately adjusting the flow rate of refrigerant without giving any trouble to the regulation of rotation of rotor even if a refrigerant of high pressure is employed while making it possible to employ various kinds of parts such as stators, as they are, which are now employed in the conventional motor-operated valve.

With a view to attaining the aforementioned object, there is provided, in accordance with the present invention, a motor-operated valve comprising a valve stem having a valve plug; a valve body having a valve seat with which the valve plug is enabled to removably contact; a can fixed to the valve body; a rotor disposed coaxially in the can; a stator disposed around an outer circumferential surface of the can so as to rotatably drive the rotor; a guide bush fixedly secured to the valve body and having an axial hollow portion in which the valve stem is permitted to slidably move; and a valve stem holder which is coaxially disposed around the outer circumferential surfaces of the valve stem and the guide bush and is enabled to rotate integral with the rotor; wherein the valve stem is enabled to rotate integral with the valve stem holder and to move in the longitudinal direction thereof relative to the valve stem holder; the motor-operated valve being further provided with a flow rate adjusting feed screw mechanism, for enabling the valve plug to removably contact with the valve seat, which is constituted by a first stationary threaded portion formed on an inner circumferential surface of the guide bush and a first movable threaded portion formed on an outer circumferential surface of the valve stem and adapted to be engaged with the first stationary threaded portion; and with a rotation regulating feed screw mechanism which is constituted by a second stationary threaded portion formed on an outer circumferential surface of the guide bush and a second movable threaded portion formed on an inner circumferential surface of the valve stem holder and adapted to be engaged with the second stationary threaded portion.

In a preferable embodiment, the pitch of the flow rate adjusting feed screw mechanism is smaller than the pitch of the rotation regulating feed screw mechanism.

In another preferable embodiment, the valve plug is inserted, movably in axial direction, into a cylindrical portion formed at a lower end portion of the valve stem and is engaged with a stopper portion provided in the cylindrical portion, the cylindrical portion being provided therein with a buffer spring for urging the valve plug to move downward.

In a further preferable embodiment, the motor-operated valve further comprises a rotation regulating stopper mechanism which is constituted by a stationary stopper attached to the guide bush or the valve body, and by a movable stopper attached to the valve stem holder and enabled to press-contact with the stationary stopper.

According to the motor-operated valve of the present invention, it is possible to finely and appropriately adjust the flow rate of refrigerant without giving any trouble to the regulation of rotation of rotor even if a refrigerant of high pressure is employed while making it possible to employ various kinds of parts such as stators, as they are, which are now employed in the conventional motor-operated valve.

DETAILED DESCRIPTION OF AN EXEMPLARY EMBODIMENT

One embodiment of the present invention will be explained in detail with reference to the drawings.

Figure 1:
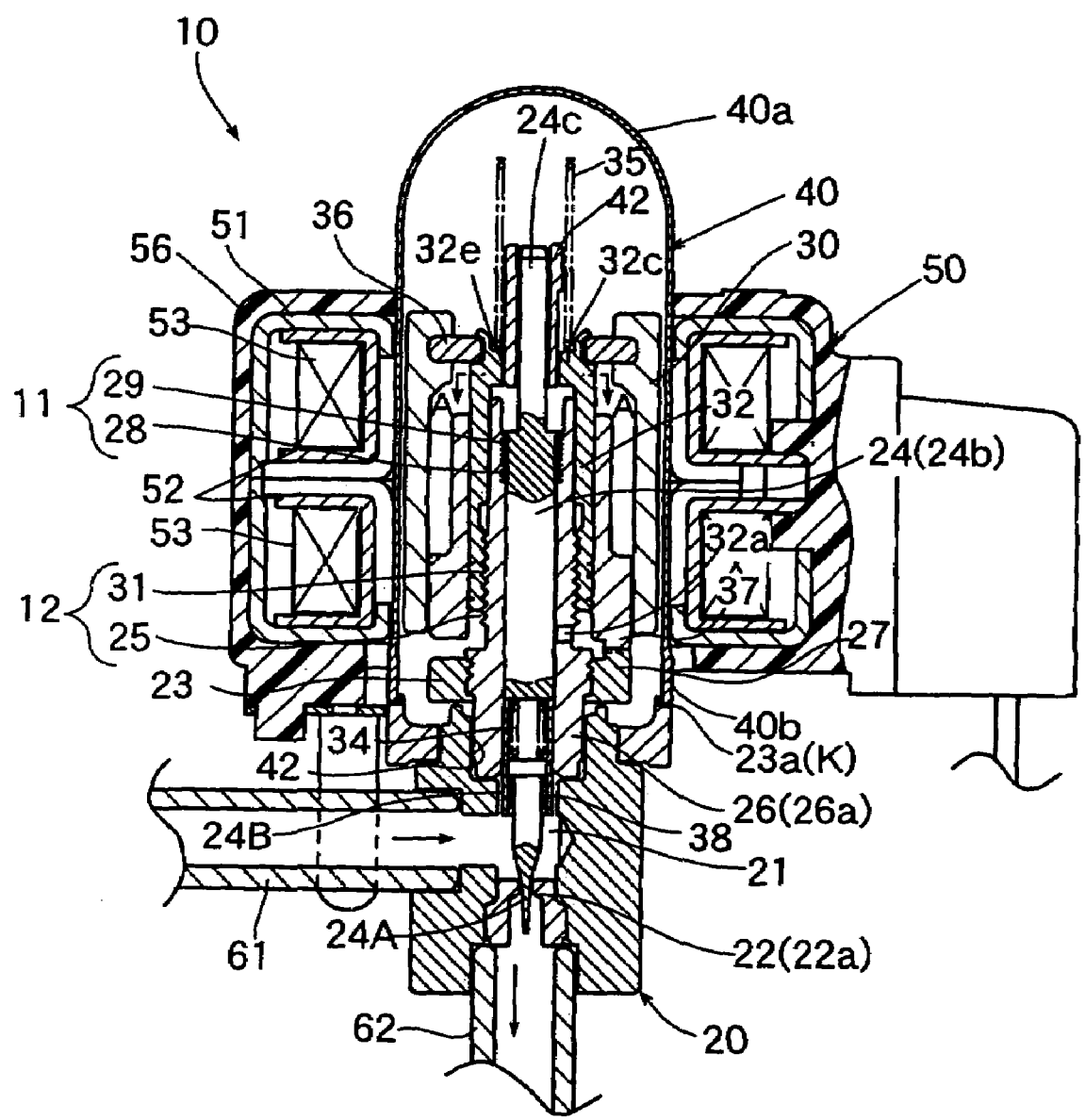
FIG. 1 is a longitudinal sectional view illustrating one embodiment of the motor-operated valve according to the present invention.
Figure 3:
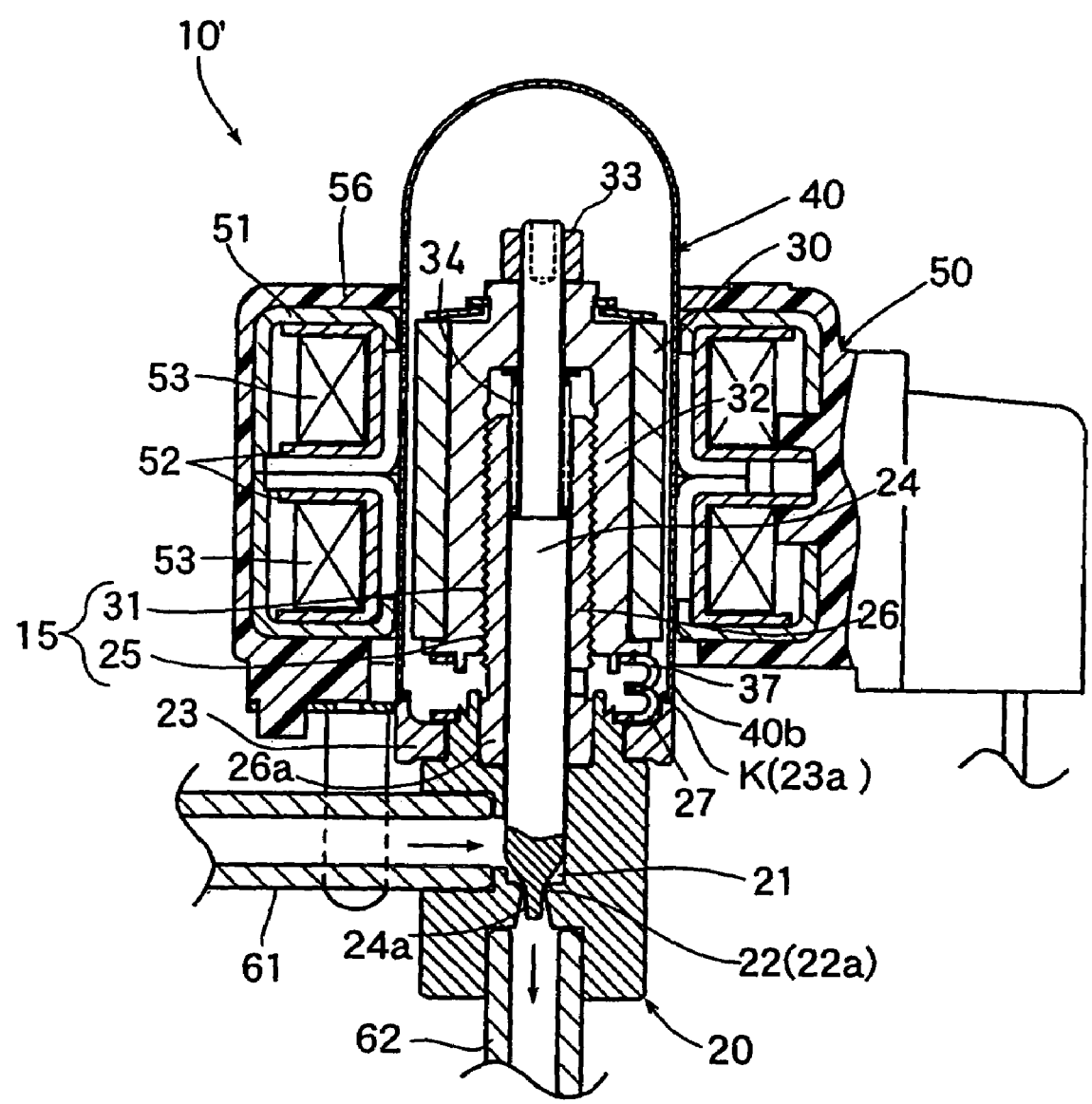
FIG. 3 is a longitudinal sectional view illustrating one embodiment of the motor-operated valve according to the prior art.

FIG. 1 shows one embodiment of the motor-operated valve according to the present invention wherein the same members or parts as those of the motor-operated valve 10' shown in FIG. 3 are designated by the same reference numerals.

The motor-operated valve 10 shown in FIG. 1 is provided with a valve chamber 21; a valve seat 22 (a valve aperture 22a); a valve body 20 having a flange-like member 23 and constructed to adjust the flow rate of refrigerant by making use of a needle-like valve plug 24A which is enabled to move close to or away from the valve seat 22; a can 40 which is hermetically joined, through a lower end 40b thereof and by means of welding, with the valve body 20; a rotor 30 which is coaxially positioned in the can 40 with a predetermined gap being formed between the outer circumferential wall of the rotor 30 and the inner circumferential wall of the can 40; and a stator 50 disposed around an outer circumferential surface of the can 40 so as to rotatably drive the rotor 30.

The valve chamber 21 of valve body 20 is communicated, through one side portion thereof, with a refrigerant inlet pipe 61 for introducing a high-pressure carbon dioxide (gas) as a refrigerant into the valve chamber 21 and also communicated, through a bottom portion thereof, with a refrigerant outlet pipe 62.

A stator 50 is constituted by a yoke 51 made of a magnetic material, a couple of upper and lower stator coils 53 which are wound, through a bobbin 52, around the yoke 51, and a resin mold cover 56. A motor (a stepping motor in this embodiment) is constituted by the rotor 30, the stator 50, and the stator coils 53. In this embodiment, the stator 50 is formed of the same one as conventionally employed. The application of electric current to the stator 50 is controlled such that rotor 30 can be rotated five revolutions at maximum.

As for the materials for the rotor 30, a rare earth plastic magnet such as Nd—Fe—B type magnet can be employed.

The can 40 may be formed of a non-magnetic metal such as stainless steel and is formed into a closed end cylindrical configuration having a hemispherical top 40a which can be manufactured by means of deep drawing, etc.

A lower end 40b (flange portion) of the can 40 is hermetically connected with a step portion 23a formed on a stainless steel flange-like member 23 which is fixed to an upper portion of valve body 20 by means of butt welding (the welded portion is indicated by K), thereby ensuring an air-tight state of the interior of can 40.

Inside the can 40, there are disposed a brass valve stem 24 having the valve plug 24A, a bush 26 having a lower end portion 26a introduced (screwed) into and fixed to a hole 42 formed in the valve body 20 and also having an axial hollow portion in which the valve stem 24 is permitted to slidably move, and a cylindrical valve stem holder 32 which is coaxially disposed around the outer circumferential surfaces of the valve stem 24 and the guide bush 26 and is enabled to rotate integral with the rotor 30.

The valve plug 24A is inserted, movably in axial direction, into a cylindrical portion 24B formed at a lower end portion of the valve stem 24 and is engaged with a collar 38 press-fixed to the cylindrical portion 24B. Inside the cylindrical portion 24B, there is disposed, in a compressed state, a buffer coil spring 34 for urging the valve plug 24A to move downward.

In this embodiment, the distal end portion (a lower end portion) of the valve plug 24A is made thinner than that of the conventional valve plug 24a shown in FIG. 3, so that the diameter of the valve aperture 22a is made correspondingly smaller (e.g. the conventional size of about 1.5 mm is decreased to 0.5 mm for example in this embodiment).

In order to enable the valve plug 24A to removably contact with the valve seat 22, a first stationary threaded portion 28 is formed on an inner circumferential surface of an upper portion of the guide bush 26 and, at the same time, a first movable threaded portion 29 is formed on an outer circumferential surface of an upper portion of enlarged portion 24b of the valve stem 24 so as to enable the first movable threaded portion 29 to engage with the first stationary threaded portion 28. Through this combination of the first stationary threaded portion 28 and the first movable threaded portion 29, a flow rate adjusting feed screw mechanism 11 is constructed.

Figure 2:
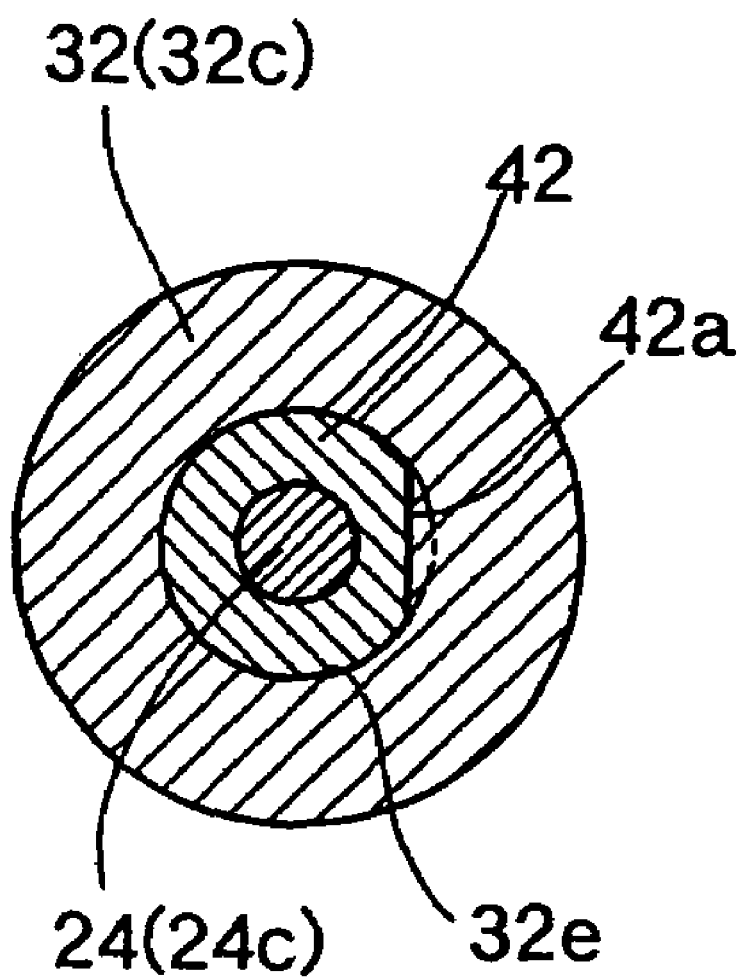
FIG. 2 is an enlarged cross-sectional view taken along the line A—A of FIG. 1.

The valve stem holder 32 is provided, at a top central portion 32c thereof, with a hole 32e, into which a lower portion of the valve stem rotating sleeve 42 having a D-shaped cut portion (beveled portion 42a) as shown in FIG. 2 is movably inserted. Further, an upper thin portion 24c of the valve stem 24 is press-fitted into the valve stem rotating sleeve 42. Therefore, the valve stem 24 is enabled to rotate integral with the valve stem holder 32 and at the same time, enabled to move in axial direction thereof relative to the valve stem holder 32.

Further, the guide bush 26 is provided, at the outer circumferential surface of an intermediate portion thereof, with a second stationary threaded portion 25, and the valve stem holder 32 is provided, on an inner circumferential surface of a lower end portion thereof, with a second movable threaded portion 31 which is adapted to be engaged with the second stationary threaded portion 25. Through this combination of the second stationary threaded portion 25 and the second movable threaded portion 31, a rotation regulating feed screw mechanism 12 is constructed.

By the way, the guide bush 26 is further provided, on one sidewall thereof, with an equalizing hole 32a for equalizing the inner pressure between the valve chamber 21 and the can 40. The valve stem holder 32 is also provided, on the top thereof, with a return spring 35 which acts to restore the engagement of threaded portions of the rotation regulating feed screw mechanism 12 when the threaded portions are disengaged.

The valve stem holder 32 is connected, via a supporting ring 36, with the rotor 30. This supporting ring 36 in this embodiment is constituted by a brass ring which has been inserted into the rotor 30 on the occasion of forming the rotor 30. An upper projected portion of the valve stem holder 32 is caulked to the supporting ring 36 to thereby integrally connect the rotor 30, the supporting ring 36 and the valve stem holder 32 with each other.

To the guide bush 26 is fixedly attached a stationary stopper 27 constituting one of the rotation regulating stopper mechanism, and to the valve stem holder 32 is fixed attached a movable stopper 37 constituting the other of the stopper mechanism.

In this embodiment, the pitch of the rotation regulating feed screw mechanism 12 is set for example to 0.6 mm (the same as the conventional feed screw mechanism 15) and the pitch of the flow rate adjusting feed screw mechanism 11 is set for example to 0.2 mm.

According to the motor-operated valve 10 which is constructed as described above, when the stator coils 53 are excited through the application of electric current thereto in one direction under a condition where the valve plug 24a is kept away or lifted from the valve seat 22 (valve aperture 22a is opened), the rotor 30 and the valve stem holder 32 are caused to rotate in one direction relative to the guide bush 26 which is fixedly secured to the valve body 20. Therefore, the valve stem holder 32 is enabled to move downward by 0.6 mm for example in every one revolution of thereof to be effected by the rotation regulating feed screw mechanism 12 and at the same time, the valve stem 24 is enabled to move downward by 0.2 mm for example in every one revolution of thereof to be effected by the flow rate adjusting feed screw mechanism 11, thus enabling the valve plug 24A to press-contacted with the valve seat 22 to thereby close the valve aperture 22a.

Even at this moment where the valve aperture 22a is closed, a movable stopper 37 provided at a lower end portion of the valve stem holder 32 is not yet contacted with a stationary stopper 27 fixed to the valve body 20, so that the rotor 30 and the valve stem holder 32 are still permitted to rotationally move downward with the valve aperture 22a being kept closed by the valve plug 24a. On this occasion, since the valve stem 24 is moved downward relative to the valve plug 24A, a buffer coil spring 34 interposed between the valve stem 24 and the valve plug 24A is compressed to absorb the descending force of the valve stem 24. Thereafter, when the rotor 30 is further rotated to cause the valve stem holder 32 to move downward, the movable stopper 37 is caused to press-contact with the stationary stopper 27, so that even if the application of electric current to the stator coils 53 is continued, the rotation and downward movement of the valve stem holder 32 and the valve stem 24 can be forcedly suspended.

Under this suspended condition of the valve stem holder 32 and the valve stem 24, when the stator coils 53 are excited through the application of electric current thereto in the other direction, the rotor 30, the valve stem holder 32 and the valve stem 24 are caused to rotate in a direction which is opposite to the aforementioned one direction. As a result, by the action of the rotation regulating feed screw mechanism 12, the valve stem holder 32 is caused to move upward by 0.6 mm for example in every one revolution of the rotation regulating feed screw mechanism 12 (the maximum distance of lift is 3.0mm after five revolutions), thereby enabling the movable stopper 37 to move away from the stationary stopper 27 and at the same time, the valve stem 24 is caused to move upward by 0.2 mm in every one revolution thereof (the maximum distance of lift is 1.0mm after five revolutions). As a result, the valve plug 24A is caused to move away from the valve seat 22 to open the valve aperture 22a. As a result, the refrigerant that has been introduced into the valve chamber 21 from an inlet pipe 61 is permitted to flow via the valve aperture 22a into an outlet pipe 62, thereby making it possible to adjust the flow rate of refrigerant depending on the magnitude of lift of the valve plug 24a.

As described above, since the motor-operated valve according to this embodiment is constructed to comprise the flow rate adjusting feed screw mechanism 11 and the rotation regulating feed screw mechanism 12 and at the same time, the pitch of the flow rate adjusting feed screw mechanism 11 is decreased to about ⅓ of the pitch of the rotation regulating feed screw mechanism 12, it is now possible to finely and appropriately adjust the flow rate of refrigerant without giving any trouble to the regulation of rotation of rotor even if a refrigerant of high pressure is employed.

What is claimed is:

1. A motor-operated valve comprising:
   a valve stem having a valve plug;
   a valve body having a valve seat with which the valve plug is enabled to removably contact;
   a can fixed to the valve body;
   a rotor disposed coaxially in the can;
   a stator disposed around an outer circumferential surface of the can so as to rotatably drive the rotor;
   a guide bush secured to the valve body and having an axial hollow portion in which the valve stem is permitted to slidably move; and
   a valve stem holder which is coaxially disposed around the outer circumferential surface of the valve stem and the guide bush and is enabled to rotate integral with the rotor;
   wherein the valve stem is enabled to rotate integral with the valve stem holder and to move in the longitudinal direction thereof relative to the valve stem holder;
   the motor-operated valve further comprising a flow rate adjusting feed screw mechanism, for enabling the valve plug to be in removable contact with the valve seat, which is constituted by a first stationary threaded portion formed on an inner circumferential surface of the guide bush and a first movable threaded portion formed on an outer circumferential surface of the valve stem and adapted to be engaged with the first stationary threaded portion; and with a rotation regulating feed screw mechanism which is constituted by a second stationary threaded portion formed on an outer circumferential surface of the guide bush and a second movable threaded portion formed on an inner circumferential surface of the valve stem holder and adapted to be engaged with the second stationary threaded portion.

2. The motor-operated valve according to claim 1, wherein the pitch of the flow rate adjusting feed screw mechanism is smaller than the pitch of the rotation regulating feed screw mechanism.

3. The motor-operated valve according to claim 1, wherein the valve plug is inserted, movably in axial direction, into a cylindrical portion formed at a lower end portion of the valve stem and is engaged with a stopper portion provided in the cylindrical portion, the cylindrical portion comprising a buffer spring for urging the valve plug to move.

4. The motor-operated valve according to claim 1, which further comprises a rotation regulating stopper mechanism which is constituted by a stationary stopper attached to the guide bush or the valve body, and by a movable stopper attached to the valve stem holder and enabled to cooperate with the stationary stopper.

* * * * *